United States Patent

[11] 3,528,329

| [72] | Inventor | André Chartet<br>Meudon, France |
|---|---|---|
| [21] | Appl. No. | 711,079 |
| [22] | Filed | March 6, 1968 |
| [45] | Patented | Sept. 15, 1970 |
| [73] | Assignee | Societe Anonyme des Usines Chausson<br>Asnieres, Hauts-de-Seine, France<br>a company of France |
| [32] | Priority | April 14, 1967 |
| [33] | | France |
| [31] | | 102,277 |

[54] PROCESS AND DEVICE FOR CUTTING THIN ELEMENTS SUCH AS TUBES FOR RADIATORS INTO PARTS OF EQUAL LENGTH
10 Claims, 3 Drawing Figs.

[52] U.S. Cl............................................. 83/37,
83/311, 83/314, 83/315, 83/339
[51] Int. Cl................................................B23d 45/12,
B23d 45/24
[50] Field of Search .................................. 83/37, 311,
314, 315, 337, 339, 491

[56]  References Cited
UNITED STATES PATENTS

| 2,534,977 | 12/1950 | Kling................................ | 83/315X |
| 2,703,614 | 3/1955 | Bottenhorn .................. | 83/314X |
| 2,839,872 | 6/1958 | Cline............................. | 83/315X |
| 2,873,854 | 2/1959 | Dapp et al. .................... | 83/315UX |

*Primary Examiner*—William S. Lawson
*Attorney*—Imirie and Smiley

ABSTRACT: An oscillating arm carries a rotatable circular saw as well as means for rotating the saw. A reading wheel is in contact with the element to be cut and is at least partly driven by the element. A crank-and-connecting-rod transmission drivingly connects the reading wheel with the oscillating arm. Spring means is operatively connected with the oscillating arm so as to exert a force on the arm proportional to the oscillating movement of the arm. The spring means applies forces to the arm in phase opposition to the inertia forces produced by movement of the arm, the force applied by the spring means being applied at a natural frequency substantially the same as the frequency of the oscillation of the arm.

Patented Sept. 15, 1970
3,528,329
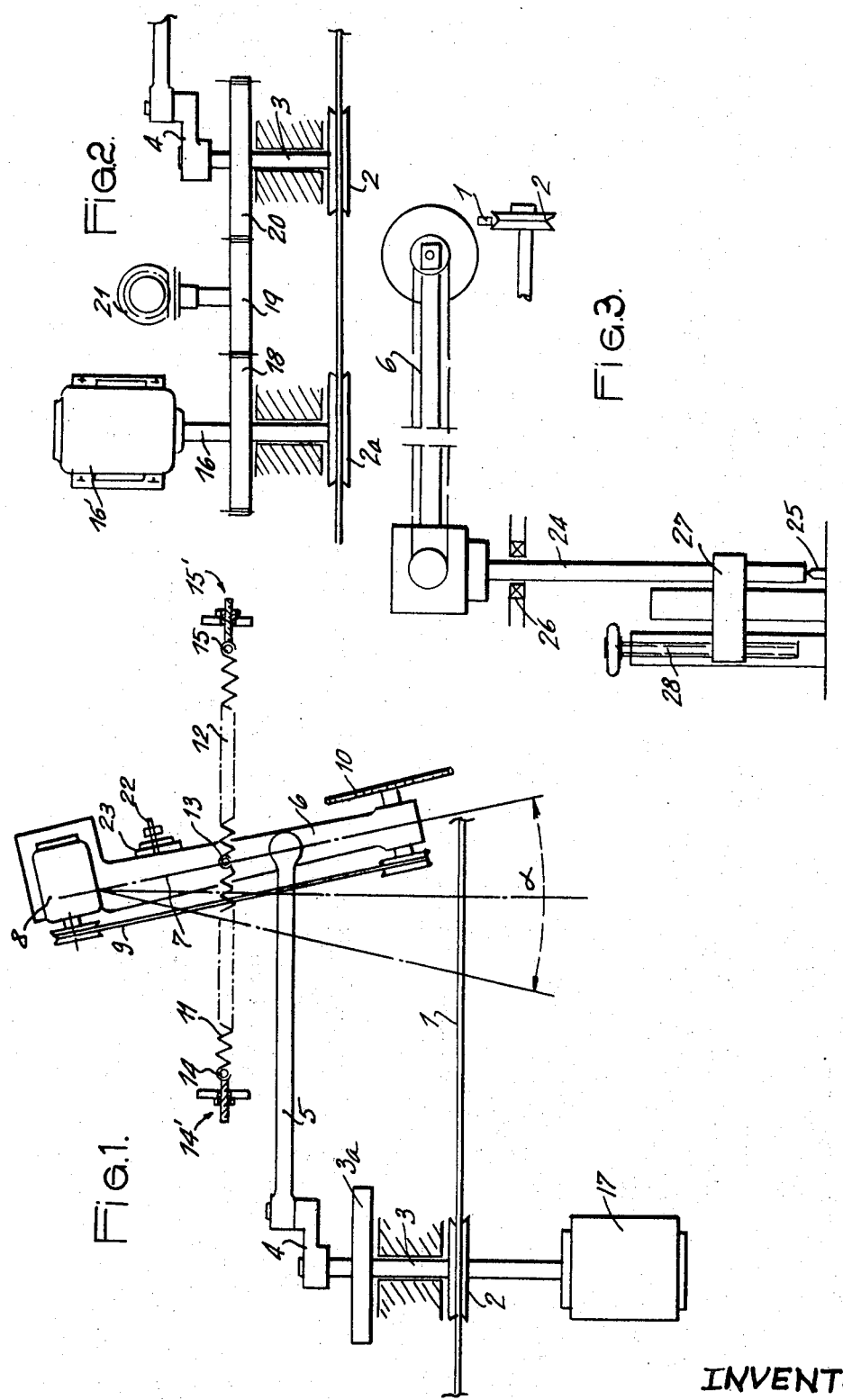
INVENTOR
ANDRE CHARTET

PROCESS AND DEVICE FOR CUTTING THIN ELEMENTS SUCH AS TUBES FOR RADIATORS INTO PARTS OF EQUAL LENGTH

The present invention relates to cutting thin elements of small section, particularly tubes made continuously, as in the case of tubes used in the radiator industry.

It is known to cut tubes continuously shaped by circular saws mounted on an oscillating arm whose drive is effected from one or more reading-wheels in contact with the tube. These machines give satisfaction, but the rate at which they can work is limited, for, when the speed of the element to be cut is increased, the forces of inertia applying to the oscillating arm obviously increase and this results in sliding of the reading wheel or wheels in relation to the element which drives them, this sliding having the effect of entailing an irregularity along the cut parts of tube. At present, it is known to manufacture machines for shaping tubes capable of very high speeds, but these speeds are limited by the cutting devices used, which prevents them from being employed at their maximum output.

The present invention obviates this disadvantage by creating a new process in which a rotary movement sawing member is used, said member is made to support a swinging movement element, said swinging movement element is subjected to a device for measuring the advancing speed of the work part to be cut, and resilient recoil forces are made to act simultaneously on said swinging element tending to bring said swinging movement element towards its middle position, with an intensity proportional to the divergence shown by said element to said middle position. In these conditions, the alternated resilient forces applied to the swinging movement element will be at every moment in phase with the alternated forces of inertia to which it is subjected but in the opposite direction to said alternated forces.

Actually, the movement of a swinging element such as an oscillating arm according to an angle $\alpha$ and driven, for instance, by a crank-and-connecting rod system, can be shown by an equation of the form $$\alpha = \alpha_0 \sin \omega t$$

while considering that the driving connecting rod has a sufficient length so that the influence of its slope during the movement to which it is subjected can be neglected.

In these conditions, the force that must be transmitted by the connecting rod to overcome the inertia of the oscillating arm is of the form $$F = +I_0 \omega^2 \sin \omega t$$

$\omega$ representing in both equations the circular frequency, i.e., $2\pi F$ with F equal to the frequency, $I_0$ representing a positive inertia factor and the sign + showing that the forces of inertia tend to remove the oscillating arm from its middle position.

We may thus ascertain that, whatever the frequency, there is, at every moment, proportionality between the frequency and the angle and we may put down $F = +K\alpha$, an expression in which K is a positive proportionality coefficient. Moreover, as explained above, the invention proposes to cause resilient forces to act of the form:

$$F' = -K'\alpha, \quad K \text{ being a positive coefficient.}$$

Consequently, the force that the connecting rod must transmit to the oscillating arm is of the form:

$$F'' = F + F' = (K - K')\alpha$$

i.e., that F'' will be less than F in absolute value in every case where the inequality $K' < 2K$ is complied with.

According to a second characteristic of the invention, we determine the own relevant frequency belonging to the swinging movement element to which said resilient forces are applied so that said frequency shall be close to the frequency imposed on this element by the device for measuring the advancing speed of the work part.

By applying this second characteristic of the invention, K' becomes close to, and at the limit equal to K so that the periodic force F'' to apply by the connecting rod becomes very weak and can even be practically nil for a functioning in resonance. Actually, for $K = K'$ the force F'' is cancelled out. Now, the equality $K = K'$ is obtained when the own frequency $f_0$ belonging to the oscillating arm provided with its resilient recoil is equal to the frequency $f$ imposed by the driving connecting rod.

According to a third characteristic of the invention, the swinging movment is driven by the device for measuring the advancing speed of the work part, this measuring device is directly driven by the work part and said measuring device is applied to a torque whose magnitude appreciably corresponds to the friction forces exerting on said measuring device and on said swinging movement element.

The putting into operation of this third characteristic of the invention enables the restraints to be made extremely slight that are imposed on the parts in contact with the work part and the device for measuring its advancing speed, so that the risks of slipping of the reading device are eliminated, likewise the risks of damaging the work part.

The invention also applies to a device for putting the above-mentioned process into operation. According to this second device of the invention, it comprises an oscillating arm carrying a circular saw, a reading wheel in contact with the element to be cut and at least partly driven by said element, a connecting-rod-and-crank transmission inserted between said wheel and said oscillating arm and at least one spring associated with said oscillating arm and so mounted that the resilient force that it exerts on said oscillating arm is appreciably proportional to the angle made by said oscillating arm with the bisectrix of an angle confined by the two extreme positions that this oscillating arm can assume.

Various other characteristics of the invention will moreover be revealed by the detailed description which follows.

Forms of embodiment of the invention are shown, by way of non-restrictive examples, in the attached drawing.

FIG. 1 is a diagrammatical plan of a cutting device applying the invention.

FIG. 2 is a partial plan similar to FIG. 1 showing a modification.

FIG. 3 is a diagrammatical elevation showing an alternative embodiment.

In the drawing, a thin tube is shown at 1, of the kind of those used in making radiators for motor vehicles. The device described in that which follows can nevertheless be used for all other lengthened elements continuously advancing at high speed and intended to be cut into parts of given length. The advancing speed of the tube 1, which is generally practically constant, is estimated by a reading member 2 formed, for instance, by a wheel against which the tube 1 is pressed. By a shaft 3, the wheel 2 drives a crank 4 to which is articulated the small end of a connecting rod, whose big end is, moreover, articulated on an oscillating arm 6 pivoting around a spindle 7.

The oscillating arm 6 carries an electric motor 8 which drives, through a transmission, a belt 9, for instance, a circular saw 10. The drawing shows that the oscillating arm 6 is coupled up to opposed springs 11 and 12 whose common application point on the arm 6 is shown at 13. Said two springs 11 and 12, being, furthermore, fixed respectively at 14 and 15 on fixed supports which can, however, if so required, be adjustable by means of conventional adjustment means 14' and 15' operatively connected with supports 14 and 15 respectively.

The crank 4 imposes on the oscillating arm 6 an amplitude of oscillations figured by the angle $\alpha$. The springs 12 are so mounted that they exert a recoil force in the arm 6 appreciably proportional to the divergence that this arm makes in relation to the bisectrix of the angle $\alpha$, this angle $\alpha$ being the angle swept by said arm 6 driven by a given crank 4 and connecting rod 5. A particularly advantageous arrangement consists of determining the strength of the springs 11, 12 as a function of the mass of the oscillating arm 6, so as to impart to the oscillating arm, spring and connecting rod, its own frequency which is near to the frequency at which said oscillating arm is driven by the reading wheel 2 for an advancing speed planned for the tube 1. In this manner, the alternating stresses transmitted to the cutting wheel 2 then become very slight. The alternating stresses applied to the reading wheel can be still futher reduced by providing a flywheel 3a keyed on to the shaft 3. In the particular case above, the stresses to be transmitted by the tube 1 to the reading wheel 2 are practically reduced to a constant torque corresponding to the various frictions to be overcome. To compensate for frictions, it is advantageous, as shown in FIG. 1, to provide a variable speed motor 17 whose shaft is keyed on to the shaft 3.

FIG. 2 shows an alternative providing a second reading wheel 2a keyed on to the shaft 16 of the variable speed electric motor 16' and pinions 18, 19 and 20 connecting the shaft 16 to the shaft 3 of FIG. 1, the pinion 19 accessorily making it possible, by a return device 21, to drive a mechanism enabling parts or segments of cut tubes to be put in order.

To act on the frequency relevant to the oscillating assembly, various means can be considered. In the first place, the application points 14 and 15 of the springs 11, 12 can be adjustable. Then, said springs 11, 12 can be mounted so as easily to be exchanged for other springs. Another possibility for carrying out adjustments consists of providing the oscillating arm 6 with a support 22 for additional weights 23 enabling the mass of the oscillating assembly to be regulated.

To regulate the length of the parts or sections of tubes requiring to be cut, one may proceed in various manners, for instance, by altering the length of the oscillating arm 6 without altering the angle α. The angle α can also be modified by changing the crank 4 or at least the articulation point of the big end of the connecting rod 5 on said crank 4. The reading wheel 2 may also be changed.

In FIG. 1, it has been shown that the resilient forces to counterbalance the alternated forces of inertia were set up by spiral springs, but it is obvious that other types of springs can be used.

In particular, FIG. 3 shows that the oscillating arm 6 can be coupled up to a torsion bar 24 coaxial to the pivoting spindle 7. The torsion bar 24, so that its action is adjustable, can, for instance, be supported by a pivot 25 and guided at its top part in a bearing 26, whereas its anchoring point is modified at will by a device 27, a set of clamps, for instance, able to be moved on part of the length of the bar 24 by a maneuvering member 28. In like manner, other resilient means can also be used, specifically, springs of the spiral type.

The invention is not restricted to the examples of embodiment shown and described in detail, for various modifications can be applied to it without going outside its scope.

I claim:

1. Device for cutting thin elements into cut parts of equal length, such as tubes for radiators, characterized in that it comprises an oscillating arm carrying a rotatable circular saw, means for rotating said saw, a reading wheel in contact with the element to be cut and at least partly driven by said element, a crank-and-connecting-rod transmission drivingly connecting said reading wheel and said oscillating arm, and spring means operatively connected with said oscillating arm and so mounted that the resilient force it exerts on the oscillating arm is substantially proportional to the angle formed by said oscillating arm with the bisectrix of an angle α defined by the two extreme limit positions of oscillation of the oscillating arm.

2. Device according to claim 1, characterized in that the reading wheel is drivingly connected to a variable speed electric motor.

3. Device according to claim 1, characterized in that a fly wheel is drivingly connected to the reading wheel.

4. Device according to claim 1, characterized in that the oscillating arm is connected with two opposed spiral springs.

5. Device according to claim 4, characterized in that the supports for the two opposed spiral springs are adjustable.

6. Device according to claim 1, characterized in that the spring means is formed by a torsion bar.

7. Device according to claim 1, including an anchoring point determining the effective length of the torsion bar, said anchoring point being adjustable.

8. Device according to claim 1 characterized in that a support for accommodating additional adjustment weights is provided on the oscillating arm.

9. A process for cutting thin elements into cut parts of equal length with a rotatable saw carried by an arm mounted for oscillating movement comprising sensing the speed of movement of the element to be cut, with sensing means, driving said arm by said sensing means to oscillate said arm in accordance with the sensed speed of movement of the element to be cut, and applying resilient forces to said arm in phase opposition to the inertia forces produced by the movement of the arm.

10. A process as set forth in claim 9, wherein the forces applied to said arm are applied at natural frequencies substantially the same as the frequencies of oscillation of said arm.